Figure 1:
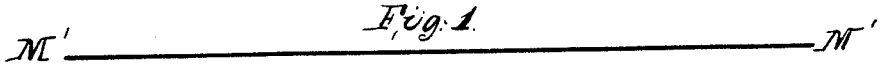
Figure 2:
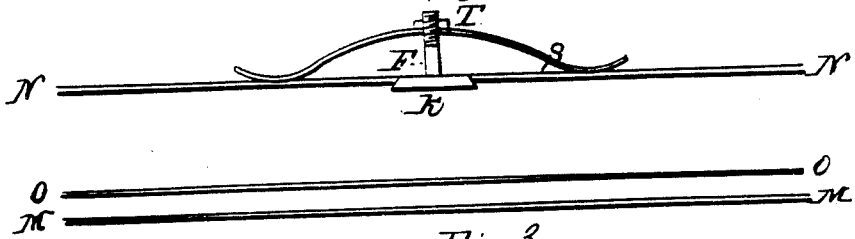
Figure 3:
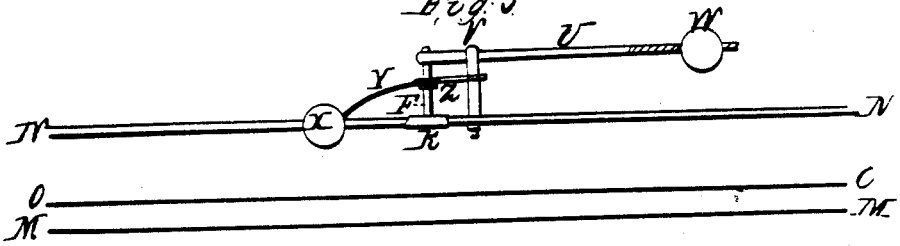

T. S. Easton,

Steam Safety Valve.

No. 53. A.I. Patented May 17, 1842.

BEST AVAILABLE COPY